United States Patent
Tsuchiya et al.

(10) Patent No.: US 8,875,508 B2
(45) Date of Patent: Nov. 4, 2014

(54) ELECTRIC BOOSTER

(75) Inventors: Shoichi Tsuchiya, Yamanashi (JP);
Hideaki Ishii, Minami-Alps (JP);
Takuya Obata, Minami-Alps (JP);
Yukio Ohtani, Kawasaki (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 868 days.

(21) Appl. No.: 13/069,962

(22) Filed: Mar. 23, 2011

(65) Prior Publication Data

US 2011/0203268 A1 Aug. 25, 2011

Related U.S. Application Data

(63) Continuation-in-part of application No. 12/361,138, filed on Jan. 28, 2009, now Pat. No. 8,387,381, and a continuation-in-part of application No. PCT/JP2009/063884, filed on Aug. 5, 2009.

(30) Foreign Application Priority Data

Jan. 31, 2008 (JP) .................................. 2008-21645
Aug. 3, 2009 (JP) ................................ 2009-181096

(51) Int. Cl.
*F15B 7/00* (2006.01)
*B60T 13/74* (2006.01)

(52) U.S. Cl.
CPC .................. *B60T 13/746* (2013.01)
USPC ............................................. 60/545; 60/538

(58) Field of Classification Search
USPC ................................................. 60/538, 545
See application file for complete search history.

(56) References Cited

U.S. PATENT DOCUMENTS 4,918,921 A * 4/1990 Leigh-Monstevens et al. 60/545
7,861,522 B2 * 1/2011 Obata et al. ...................... 60/545

(Continued)

FOREIGN PATENT DOCUMENTS

| CN | 101486342 | 7/2009 |
| JP | 2007-187262 | 7/2007 |
| JP | 2007-191133 | 8/2007 |
| JP | 2008-302725 | 12/2008 |

OTHER PUBLICATIONS

Patent Cooperation Treaty (PCT) International Preliminary Report on Patentability (in English language) issued Mar. 22, 2012 in International Application No. PCT/JP2009/063884.

(Continued)

*Primary Examiner* — Michael Leslie
(74) *Attorney, Agent, or Firm* — Wenderoth, Lind & Ponack, LLP (57) ABSTRACT

An object of the present invention is to provide an electric booster enabling an easy connection of an ECU and a stator. An ECU casing containing boards and (ECU) is attached to the outer surface of the casing body so as to be located near a stator of an electric motor. The opening of the casing body is closed by a rear cover. A flat-portion through-hole (through-hole) is formed through the casing body. Bus bars connecting the stator and the ECU are disposed through the flat-portion through-hole. The bus bars are disposed such that one ends thereof are coupled with the stator while the other ends thereof protrude from the flat-portion through-hole. When the electric booster is assembled, since the stator and the bus bars are disposed at the casing body having the flat-portion through-hole, it is possible to easily assemble the casing body and the rear cover with the bus bars inserted through the flat-portion through-hole.

18 Claims, 7 Drawing Sheets

(56) References Cited

U.S. PATENT DOCUMENTS

| | | | |
|---|---|---|---|
| 8,011,184 B2 * | 9/2011 | Ohtani et al. | 60/545 |
| 8,096,122 B2 * | 1/2012 | Ikeda et al. | 60/545 |
| 8,387,381 B2 * | 3/2013 | Ohno et al. | 60/545 |
| 8,555,634 B2 * | 10/2013 | Ohno et al. | 60/545 |
| 2008/0302100 A1 | 12/2008 | Ohtani et al. | |
| 2009/0178404 A1 | 7/2009 | Ikeda et al. | |

OTHER PUBLICATIONS

International Search Report issued Nov. 17, 2009 which is the priority application of International (PCT) Application No. PCT/JP2009/063884.

* cited by examiner

ELECTRIC BOOSTER

CROSS REFERENCE TO RELATED APPLICATION

This application is a continuation-in-part application of U.S. patent application Ser. No. 12/361,138 filed on Jan. 28, 2009 now U.S. Pat. No. 8,387,381 and International Application PCT/JP2009/63884 filed on Aug. 5, 2009.

TECHNICAL FIELD

The present invention relates to an electric booster for use in a brake system of a vehicle. More specifically, the present invention relates to an electric booster with use of an electric motor as a boosting source.

BACKGROUND ART

A conventional art of this kind of electric booster is disclosed in Japanese Patent Application Public Disclosure No. 2008-302725. In the electric booster disclosed in Japanese Patent Application Public Disclosure No. 2008-302725, an electric motor, and an ECU (Electric Control unit) for supplying an electric current to a stator of the electric motor to control the electric motor are integrally provided. The electric motor is actuated in response to an actuation instruction from the ECU. The rotation of the electric motor is converted into a linear motion by a rotation-linear motion converting mechanism, and is transmitted to an output member which then causes a piston of a master cylinder to advance, thereby generating a brake fluid pressure in a pressure chamber in the master cylinder.

In the above-mentioned conventional electric booster, the ECU for controlling the electric motor is disposed at a front-side casing member (first casing), while the stator of the electric motor is disposed at a rear-side casing member (second housing) which covers the opening of the front-side casing member at the rear end thereof. As a result, the wiring process for connecting the ECU and the stator is troublesome in this electric booster.

SUMMARY OF THE INVENTION

An object of the present invention is to provide an electric booster enabling an easy connection of an ECU and a stator.

To achieve the above-mentioned object, the present invention provides an electric booster comprising:

an ECU;

an electric motor adapted to rotate in response to an instruction from the ECU;

a rotation-linear motion converting mechanism operable to convert a rotation of the electric motor into a linear motion;

an output member operable to transmit the converted linear motion; and a master cylinder operable to generate a brake fluid pressure by a piston advanced by the output member;

wherein the electric motor includes a cylindrical first housing having an opening on at least one side thereof, and a second housing covering the opening;

an annular stator is contained in the first housing;

an ECU casing containing the ECU is attached to the outer surface of the first housing so as to be situated near the stator;

a through-hole is formed at an axially intermediate position of the first housing where the ECU casing is attached; and the stator and the ECU are connected through a predetermined-shaped conductor extending through the through-hole.

The stator may be connected to the conductor at the side thereof near the opening.

The conductor may comprise a bus bar.

A rotor of the electric motor may be supported through a bearing fitted to the first housing and a bearing fitted to the second housing.

The electric booster may further comprise a rotation detector for detecting a rotation of the rotation-linear motion converting mechanism, the rotation detector being fixed to the second housing.

The ECU casing may have an opening at the side attached to the first housing, and the opening of the ECU casing may be closed by the first housing.

The present invention further provides an electric booster, comprising:

an ECU;

an electric motor adapted to rotate in response to an instruction from the ECU;

a rotation-linear motion converting mechanism operable to convert a rotation of the electric motor into a linear motion;

an output member operable to transmit the converted linear motion; and a master cylinder operable to generate a brake fluid pressure by a piston advanced by the output member;

wherein the electric motor includes a cylindrical front housing having an opening on at least one side thereof;

a circumferentially extending stepped portion is formed inside the front housing at the master cylinder side thereof;

an annular stator inserted from the opposite side from the master cylinder is attached to the stepped portion;

an ECU casing containing the ECU is attached to the outer surface of the front housing so as to be situated near the stator;

the opening of the front housing is closed by a rear housing;

a through-hole is formed at an axially intermediate position of the front housing where the ECU casing is attached; and a predetermined-shaped conductor extending through the through-hole to connect the stator and the ECU is provided.

The stator may be connected to the conductor at the side thereof near the opening.

The conductor may comprise a bus bar.

A rotor of the electric motor may be supported through a bearing fitted to the front housing and a bearing fitted to the rear housing.

The electric booster may further comprising a rotation detector for detecting a rotation of the rotation-linear motion converting mechanism, the rotation detector being fixed to the rear housing.

The ECU casing may have an opening at the side attached to the front housing, and the opening of the ECU casing may be closed by the front housing.

The present invention further provides an electric booster, comprising:

an electric motor adapted to rotate in response to an instruction from an ECU;

a rotation-linear motion converting mechanism operable to convert a rotation of the electric motor into a linear motion to advance a piston of a master cylinder; and a casing housing the electric motor and the rotation-linear motion converting mechanism;

wherein the casing includes:

a cylindrical front housing having an opening on at least one side thereof; and a rear housing covering the opening of the front housing;

an ECU casing containing the ECU is detachably attached to the casing, the front housing includes:

a stepped portion to which an annular stator inserted from the opening is attached; and a front housing through-hole provided at the side of the front housing which is closer to the opening than to the stepped portion;

the ECU casing includes an ECU casing through-hole which is aligned with the front housing through-hole when the ECU casing is attached to the casing, a conductor connecting the stator and the ECU is arranged to extend through the front housing through-hole and the ECU casing through-hole.

The conductor may comprise a bus bar.

A rotor of the electric motor may be supported through a bearing fitted to the front housing and a bearing fitted to the rear housing.

The electric booster may further comprising a rotation detector for detecting a rotation of the rotation-linear motion converting mechanism, the rotation detector being fixed to the rear housing.

The ECU casing may have an opening at the side attached to the front housing, and the opening of the ECU casing may be closed by the front housing.

A circumferentially extending stepped portion may be formed inside the first housing, and the stator is attached to the stepped portion.

According to the electric booster of the present invention, the ECU and the stator can be easily connected with each other.

DETAILED DESCRIPTION OF THE INVENTION

Hereinafter, an embodiment for carrying out the present invention will be described with reference to the accompanying drawings.

FIGS. 1 to 4 show a structure of an electric booster according to an embodiment of the present invention. An electric booster 10 has one end fixed to a partition wall W separating an engine room R1 and a vehicle compartment R2, and the other end comprising a motor casing 11 (hereinafter abbreviated as "casing" as appropriate) coupled to a tandem master cylinder 1 which will be described later. Hereinafter, for convenience of description, the engine room R1 side is referred to as "front side", and the vehicle compartment R2 side is referred to as "rear side". The casing 11 comprises a cylindrical casing body 12 as a first housing and a front housing, and a rear cover 13 as a second housing and a rear housing. The rear cover 13 is fixed to the rear end of the casing body 12 by a bolt, and sealingly covers the opening at the rear end of the casing body 12 with the aid of a seal material 13a. A stepped front wall 12a is integrally formed at the front end of the casing body 12. The tandem master cylinder 1 is fixedly coupled to the front wall 12a with use of a stud bolt 14. The rear cover 13 is fixedly coupled to the partition wall W with use of a stud bolt 15. While the components are fixedly coupled in this way, a cylindrical boss portion 13b integrally formed at the rear cover 13 extends into the vehicle compartment R2 through the partition wall W. The front wall 12a includes a front wall body 12b formed substantially perpendicularly to the casing body 12, and further includes annular first, second and third stepped portions 12c, 12d and 12e respectively having a small inner diameter, a medium inner diameter and a large inner diameter, thereby defining a stepped configuration as mentioned above. The first, second, and third stepped portions 12c, 12d and 12e are formed at the front wall body 12b so as to be arranged in this order. The inner diameters of the first, second and third stepped portions 12c, 12d and 12e are sized such that the portions 12c, 12d and 12e can respectively fittedly contain a bearing 36, a stator coil 33a of a stator 33 and a stator body 33b, which will be described later. In the present embodiment, the second and third stepped portions 12d and 12e constitute a stepped portion to which the stator 33 is attached.

The casing 11 constituting the electric booster 10 contains a piston assembly 20, which also serves as a primary piston of the tandem master cylinder 1, and an electric actuator 30 operable to actuate a booster piston 21 (output member) which constitutes the piston assembly 20. An ECU 50, which will be described later, is integrally disposed on the top of the casing 11 (the casing body 12 and the rear cover 13) for controlling an actuation of the electric actuator 30.

Figure 3:
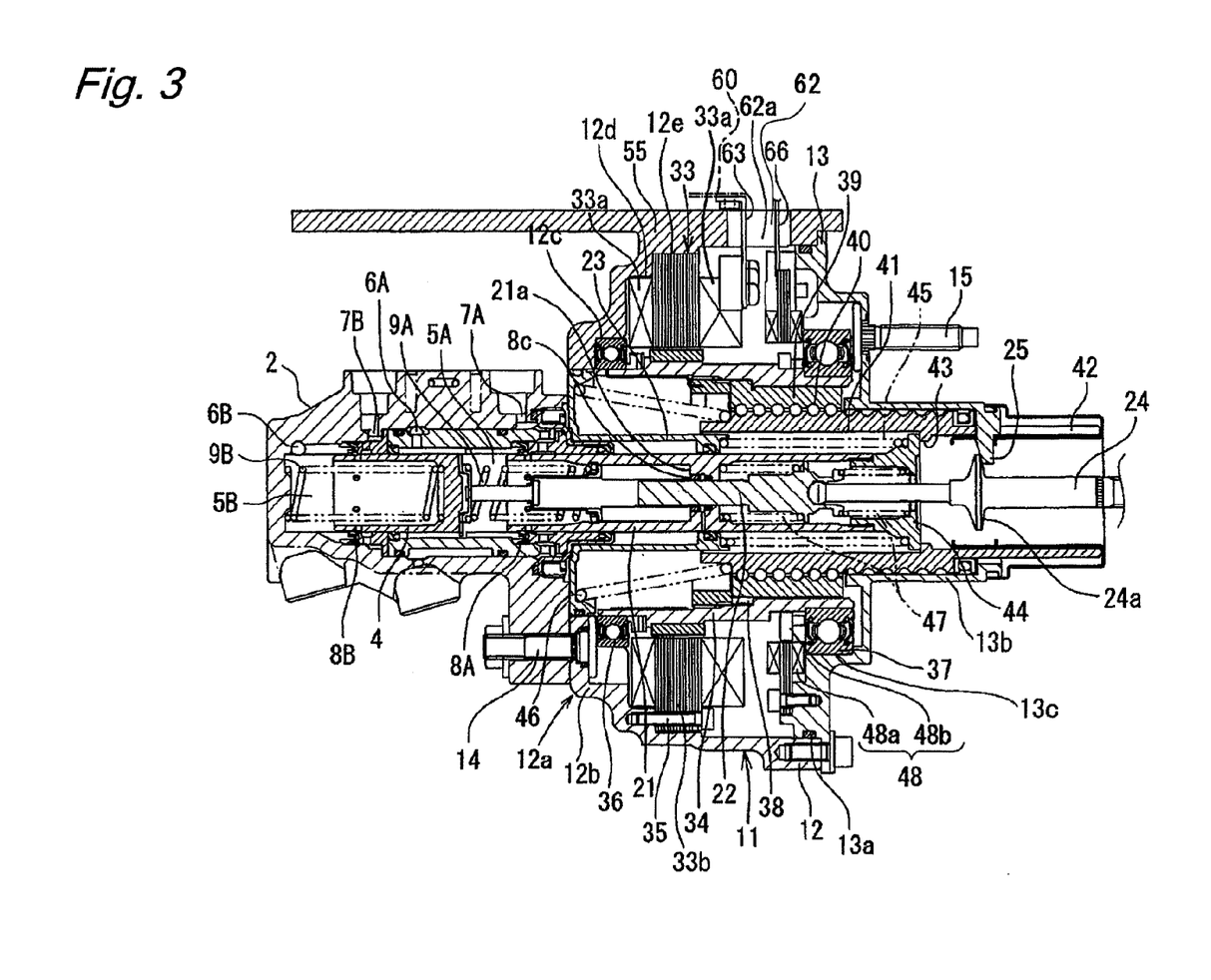
FIG. 3 is a cross-sectional view illustrating a structure of a main portion of the electric booster as the embodiment.

As also shown in FIG. 3, the tandem master cylinder (hereinafter referred to as just "master cylinder") 1 comprises a bottomed cylinder body 2 and a reservoir 3. A secondary piston 4, which makes a pair with the piston assembly 20 as the primary piston, is slidably disposed in the cylinder body 2 at the bottom side of the cylinder body 2. Two pressure chambers 5A and 5B are defined in the cylinder body 2 by the piston assembly 20 and the secondary piston 4. As the pistons 20 and 4 advance, the brake fluid sealingly contained in the pressure chambers 5A and 5B is pumped from discharge ports 6A and 6B formed at the cylinder body 2 into a wheel cylinder WC of the associated brake system.

Further, relief ports 7A and 7B are formed through the cylinder body 2 for connecting the insides of the pressure chambers 5A and 5B to the reservoir 3. A pair of seal members 8A and 8B is disposed on the inner surface of the cylinder body 2 so that the relief ports 7A and 7B are located therebetween. Return springs 9A and 9B are respectively disposed in the pressure chambers 5A and 5B for constantly urging backward the piston assembly 20 as the primary piston and the secondary piston 4. When the pistons 20 and 4 are at their respective backward ends, the pressure chambers 5A and 5B are in communication with the reservoir 3 through the relief ports 7A and 7B so that necessary brake fluid is supplied from the reservoir 3 into the pressure chambers 5A and 5B.

The piston assembly 20 is constituted by the above-mentioned booster piston 21 and an input piston 22. The solid input piston 22 is disposed through the cylindrical booster piston 21 so as to be movable relative to the booster piston 21. As also shown in FIG. 3, the booster piston 21 is slidably and fittedly inserted through a cylindrical guide 23 which is fittedly attached to the front wall 12a at the front end of the casing body 12. The front end of the booster piston 21 extends into the pressure chamber (primary chamber) 5A of the master cylinder 1. The input piston 22 is slidably and fittedly inserted through an annular wall portion 21a formed on the inner circumference of the booster piston 21. The front end of the input piston 22 also extends into the primary chamber 5A of the master cylinder 1. The seal member 8A provides a seal between the booster piston 21 and the cylinder body 2 of the master cylinder 1, and a seal member 8C disposed at the annular wall portion 21a provides a seal between the booster piston 21 and the input piston 22, whereby the brake fluid is prevented from leaking from the primary chamber 5A to the outside of the master cylinder.

Referring to the rear end of the input piston 22, the tip of an input rod 24 adapted to move according to a movement of a brake pedal (not shown) is rotatably coupled to the rear end of the input piston 22. Due to this configuration, the input piston 22 can move forward and backward in the booster piston 21 in response to an operation of the brake pedal (pedal operation). An enlarged diameter portion 24a is integrally formed at an intermediate position of the input rod 24. A backward movement (movement toward the vehicle compartment R2 side) of the input rod 24 is limited by the abutment of the enlarged diameter portion 24a against an inner protrusion 25 which is integrally formed at the rear end of the cylindrical boss portion 13a of the rear cover 13. That is, the backward end of the input piston 22 is the position of the input piston 22 when the enlarged diameter portion 24a of the input rod 24 abuts against the inner protrusion 25 of the rear cover 13.

The electric actuator 30 comprises an electric motor 31 and a ball screw mechanism 32 (rotation-linear motion converting mechanism) operable to convert a rotation of the electric motor 31 into a linear motion and transmit it to the booster piston 21. The electric motor 31 comprises a generally annularly formed stator 33, and a hollow rotor 34 adapted to rotate by application of an electric current to the stator 33. The stator 33 includes a plurality of coils 33a, and a stator body 33b around which the plurality of coils 33a is wound. The plurality of coils 33a wound around the stator body 33b (collectively referred to as "stator coil 33a" as appropriate, for convenience of description) is configured to have a generally annular shape. Hereinafter, when the stator coil 33a is in a state wound around the stator body 33b, the portion of the coil 33a on the right side of the stator body 33b as viewed in FIG. 3 is referred to as "coil 33a rear portion", and the portion of the coil 33a on the left side of the stator body 33b as viewed in FIG. 3 is referred to as "coil 33a front portion" as appropriate.

The electric motor 31 is fixed to the casing body 12 by use of a bolt 35 with the stator 33 thereof fitted to the second and third stepped portion 12d and 12e, while the rotor 34 of the electric motor 31 is rotatably supported by the casing body 12 and the rear cover 13 through the bearings 36 and 37. The bearing 36 is disposed fittedly to the first stepped portion 12c, and therefore to the casing body 12. The bearing 37 is disposed fittedly to a stepped portion 13c of the rear cover 13. Spaces for the insertion of the stud bolts 14 and 15 are formed at parts of the outer circumferences of the first stepped portion 12c and the stepped portion 13c, respectively.

The ball screw mechanism 32 comprises a nut member 39 non-rotatably fittedly fixed to the rotor 34 of the electric motor 31 with use of a key 38, and a hollow screw shaft 41 (linearly moving member) meshed with the nut member 39 via balls 40. An axially extending slit 42 is formed at the rear end of the screw shaft 41, and the inner protrusion 25 of the rear cover 13 is inserted through the slit 142. That is, the screw shaft 41 is arranged so that it cannot rotate in the casing 11, whereby the screw shaft 41 performs a linear movement as the nut member 39 rotates integrally with the rotor 34.

An annular protrusion 43 is formed on the inner surface of the screw shaft 41. The annular protrusion 43 is configured to abut against a flange member 44 screwed into the rear end of the booster piston 21. A return spring 45 (urging unit) is disposed between the flange member 44 and the cylindrical guide 23 fitted to the casing body 12. Due to the return spring 45, the booster piston 21 is constantly kept in a state that the flange member 44 thereof abuts against the annular protrusion 43 of the screw shaft 41. Therefore, as the screw shaft 41 moves forward in response to a rotation of the nut member 39, the booster piston 21 also moves forward by being pushed by the screw shaft 41. In the present embodiment, when the brake is not in operation, the position of the screw shaft 41 is fixed to the backward end thereof where the start end of the slit 42 abuts against the inner protrusion 25 of the rear cover 13. Accordingly, the position of the booster piston 21 when the brake is not in operation is also fixed to the backward end thereof where the flange member 44 abuts against the annular protrusion 43 of the screw shaft 41 positioned at the backward end thereof. A holding spring 46 is disposed between the screw shaft 41 and the cylindrical guide 23 for urging backward the screw shaft 41 and preventing an inappropriate forward movement of the screw shaft 41.

As best shown in FIG. 3, a pair of balance springs 47 (urging unit) is disposed between the booster piston 21 and the input piston 22 constituting the piston assembly 20. The pair of balance springs 47 serves to maintain the booster piston 21 and the input piston 22 at their neutral positions of relative displacement when the brake is not in operation.

In the present embodiment, a potentiometer (not shown) is disposed at a fixed portion in the vehicle compartment R2 for detecting an absolute displacement of the input piston 22 relative to the vehicle body based on a movement of the input rod 24 (or the brake pedal). Further, a resolver 48 (rotation detector) is disposed in the casing 11 for detecting an absolute displacement of the booster piston 21 relative to the vehicle body based on a rotational displacement of the electric motor 31. The resolver 48 comprises a resolver stator 48a attached to the rear cover 13 by a bolt, and a resolver rotor 48b disposed on the outer circumferential surface of the rotor 34 of the electric motor 31.

Figure 4:
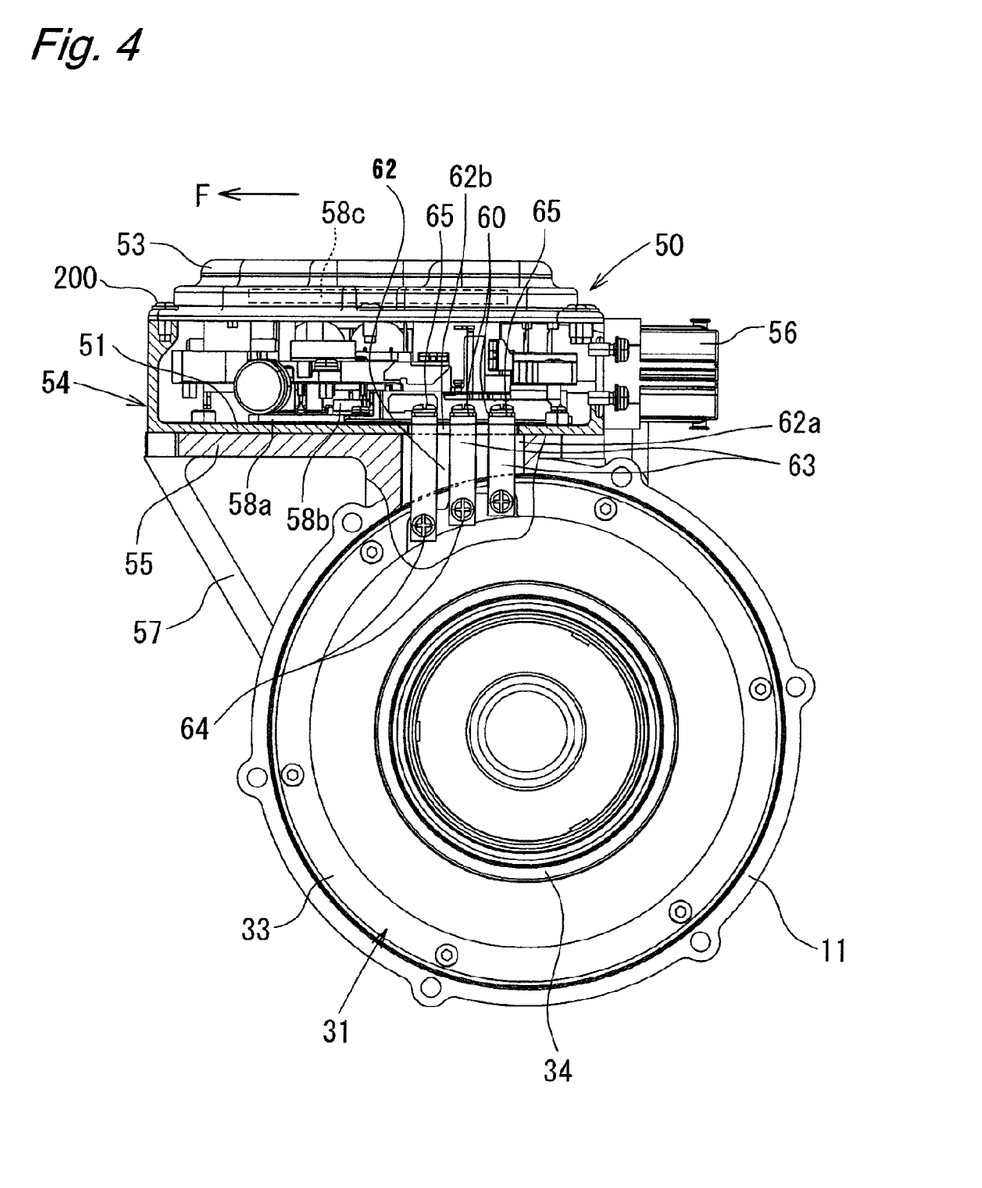
FIG. 4 is a rear view illustrating the coupling of a motor casing (a first casing without a second casing attached thereto) and an ECU in the embodiment as a partial cross-sectional view.
Figure 5:
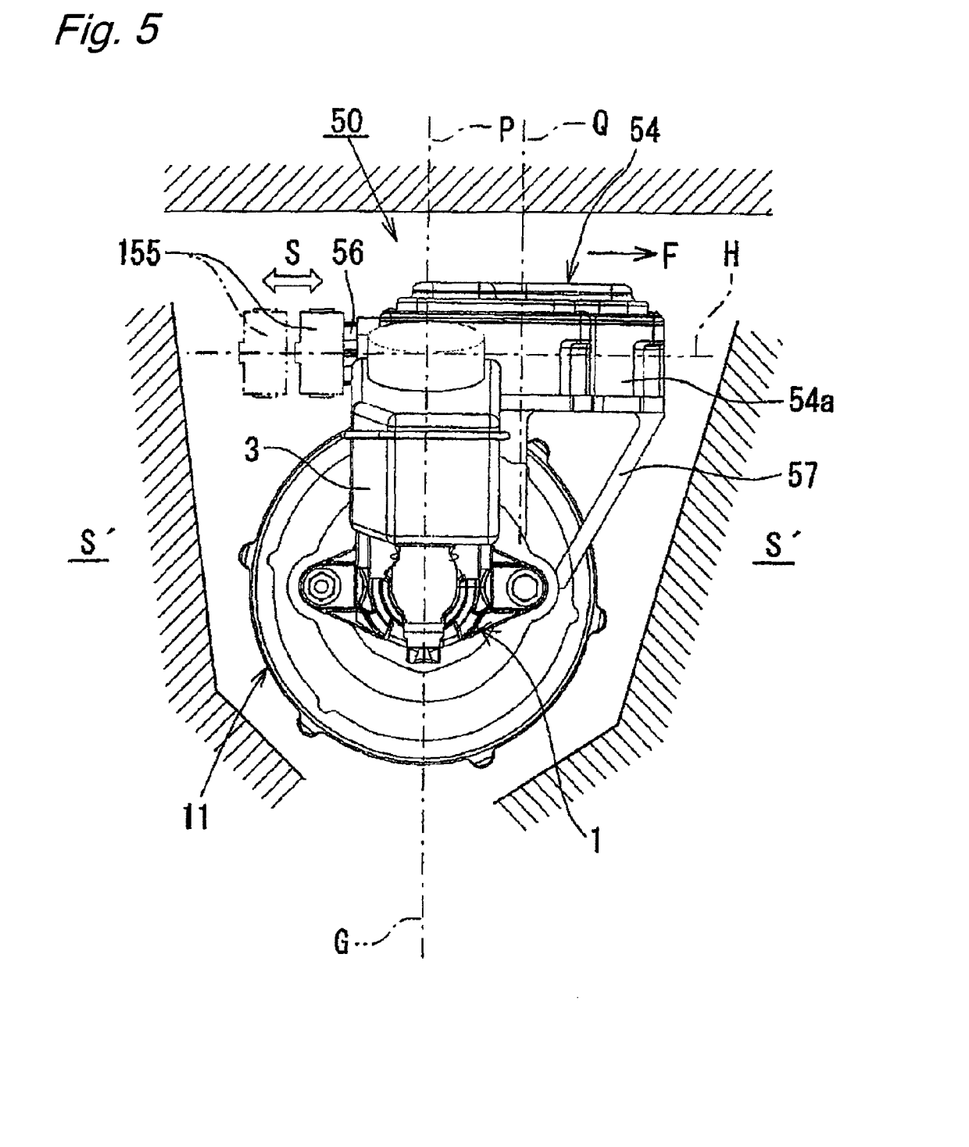
FIG. 5 is a front view illustrating the electric booster as the embodiment mounted on a vehicle.

As also shown in FIGS. 4 and 5, the ECU 50 comprises an ECU casing 54, which comprises a box-shaped casing body 52 having a bottom plate 51, and a cover 53 covering an upper opening of the casing body 52. The overall shape of the ECU casing 54 is substantially a rectangular parallelepiped. A connector 56 (male connector) is protrudingly formed at the surface (outer wall surface) of the ECU casing 54 at one side thereof, for connection to a connector 155 (female connector) (FIG. 5) of the power supply side which is connected to a not-shown battery. The female connector 155 and the male connector 56 constitute an ECU connector.

The ECU casing 54 is attachably and detachably coupled to the motor casing 11 with the bottom plate 51 of the ECU casing 54 disposed on a flat portion 55 (FIGS. 1 and 3) which is formed at the top of the motor casing 11.

As shown in FIG. 5, the ECU casing 54 is located in a plane H perpendicular to a plane G including the axis of the master cylinder 1 (which, in the present embodiment, coincides with a plane including the axis of the motor rotor 34, and is a vertical place including the direction of gravitational force) so as to be offset in one direction in the plane H. Regarding the positional relationship with the vehicle, the ECU casing 54 is positioned relative to the motor casing 11 such that a center line Q of the ECU casing 54 in the lateral direction of the vehicle and a central axis P of the motor rotor 34 are misaligned in the lateral direction of the vehicle. In FIGS. 4 and 5, an arrow F indicates this offset direction, and the ECU casing 54 is offset in the opposite direction from the side at which the male connector 56 is provided. Therefore, the male connector 56 is disposed in a state protruding from the ECU casing 54 in the opposite direction from the offset direction F. The flat portion 55 of the motor casing 11 (casing body 12) is disposed offset according to the offset of the ECU casing 54. The motor casing 11 is provided with a support portion 57 for supporting the bottom surface of the end of the flat portion 55 in the offset direction F. Due to the provision of the support portion 57, the offset ECU casing 54 can be steadily supported even when a vibration or oscillation occurs, and therefore the reliability of the electric components inside the ECU casing 54 can be improved. In the present embodiment, the ECU casing 54 is disposed in parallel with the front-rear direction of the vehicle. However, the ECU casing 54 may be disposed in a manner tilted relative to the front-rear direction of the vehicle.

As shown in FIG. 5, the ECU casing 54 is offset sufficiently for securing a space (connector-attaching/detaching space) S where the detachment and attachment between the male connector 56 and the other connector, i.e., the female connector 155 are possible without the ECU casing 54 interfering or contacting with the other components and devices in the engine room R1 when the electric booster 10 is mounted on the vehicle (in the present embodiment, the ECU casing 54 is offset approximately 30 mm). In FIG. 5, the shaded area indicates an interference area S' where the ECU casing 54 may interfere or contact with the other components and devices including a hood, a VDC unit (ABS unit) and pipes. The sufficiently wide connector-attaching/detaching space S can be secured on the opposite side from the offset direction F side by disposing the ECU casing 54 such that the ECU casing 54 is offset as much as possible yet within a range that the ECU casing 54 does not enter the interference area S' adjacent to the offset side. A concavity 54a is formed at the corner part at the end of the ECU casing 54 at the offset direction F side which faces in the vehicle front direction for preventing any interference and contact with the other components and devices, although the formation of the concavity 54a depends on the circumstances and needs.

The ECU casing 54 contains a power board 58a for supplying an electric current to the electric motor 31 (stator 33) in the motor casing 11, a power MOSFET 58b, a control board 58c for controlling the electric motor 31, a plurality of bus bar terminals 60 connected to the power board 58a (three terminals 60 in the embodiment shown in FIG. 4), and the like. Although the power board 58a generates a large amount of heat, the heat generated by the power board 58a is transmitted to the motor casing 11 through the bottom plate 51, whereby the heat release performance can be improved. Further, electric components sensitive to heat such as the control board 58c are disposed in the upper area inside the ECU casing 54 where the components can be unaffected by heat. The male connector 56 is provided with a terminal (ECU terminal) for supplying an electric current (power source) from the not-shown battery to the power board 58a, a terminal for supplying a signal from the potentiometer which detects an absolute displacement of the input piston 22 to the control board 58c, and the like.

A through-hole 62 (FIGS. 3 and 4) is formed through the bottom plate 51 of the ECU casing 54 and the flat portion 55 of the motor casing 11 on which the ECU casing 54 is disposed, for connecting the insides of the ECU casing 54 and the motor casing 11. The through-hole 62 is constituted by the part situated at the flat portion 55 which is referred to as "flat-portion through-hole 62a", and the part situated at the bottom plate 51 which is referred to as "bottom-plate through-hole 62b". The flat-portion through-hole 62a is formed at an intermediate position between the front wall 12a and the opening at the rear end in the axial direction of the casing body 12. This positional arrangement enables the formation of an annular wall along the whole circumference of the opening at the rear end of the casing body 12, whereby the opening at the rear end can be sealingly covered by the rear cover 13 with the aid of the seal member 13a sealing the annular wall. In the present embodiment, the seal member 13a is disposed at the rear cover 13, although it may be disposed at the annular wall of the casing body 12. Further, the bottom-plate through-hole 62b is covered by the flat portion 55 of the casing 12, and constitutes the opening of the ECU casing 54. A plurality of bus bars 63, which corresponds to a predetermined-shaped conductor, extends through the through-hole 62 (three bus bars 63 in the embodiment shown in FIG. 4). The bus bar 63 may be embodied by a thin plate-like or cylindrical conductive member made from a relatively rigid material. The present embodiment employs a thin plate-like type as the bus bar 63. One end of each of the multiple bus bars 63 is coupled by a screw 64 to the coil 33a rear portion of the above-mentioned plurality of coils 33a (the stator coil 33a) that is disposed to face the flat-portion through-hole 62a when the stator 33 is in a state fixed to the casing body 12 (the state shown in FIG. 4). In other words, the stator 33 is connected to the bus bars 63 at the flat-portion through-hole 62a side thereof in the axial direction of the casing body 12 shown in FIG. 3. The other end (also referred to as "upper end" as appropriate) of each of the multiple bus bars 63 is bent substantially perpendicularly to the one end of the bus bar 63, thereby forming an inverted L shape as a whole (FIG. 3). This perpendicularly bent portion has a hole through which a screw 65 is inserted, and a nut integrally attached to the lower side thereof by blazing or resin molding for screwing of the screw 65 thereinto. When the ECU casing 54 is disposed on the flat portion 55 of the casing body 12, the plurality of bus bar terminals 60 is positioned above the other ends of the bus bars 63. From this state, the bus bar terminals 60 in the ECU casing 54 are coupled to the bus bars 63 by the screws 65. The bus bar terminals 60 (the portions for the attachment of the screws 65) are disposed so as to face the bottom-plate through-hole 62b, which, along with the flat-portion through-hole 62a, constitutes the through-hole 62. Further, the positions of the control board 58c and the other electric components are arranged such that they are not located above the bus bar terminals 60, thereby enabling the screwing of the screws 65 to be performed from the cover 53 side. Further, a signal line 66 (FIGS. 1 and 3) constituted by a flexible lead wire also extends through the through-hole 62 for sending a detection signal from the resolver 48 (the resolver stator 48a) to the control board 58c in the ECU casing 54.

The process for assembling the electric booster 10 starts with the step of preparing a first subassembly body, a second subassembly body, the ball screw mechanism 32, a third subassembly body, and the ECU 50. The first subassembly body is constructed by installing the stator 33 of the electric motor 31, the bus bars 63, one of the bearings, i.e., the bearing 36, and the stud bolt 14 into the casing body 12 of the motor casing 11. The second subassembly body is constructed by installing the other of the bearings, i.e., the bearing 37, the rotor 34 of the electric motor 31, the resolver 48, and the stud bolt 15 onto the rear cover 13 of the motor casing 11. The third subassembly body is constructed by installing the input rod 24 and the balance springs 47 into the piston assembly 20. The ECU 50 is constructed by mounting the required boards 58a, 58b and 58c in the ECU casing 54, and attaching the male connector 56 to the ECU casing 54. It should be noted that the cover 53 of the ECU casing 54 is still not attached to the ECU casing 54 at this stage. More specifically, for constructing the first subassembly body, the one of the bearings, i.e., the bearing 36 is attached to the casing body 12, and the stator 33 is fixed with use of the bolt 35. Then, the one ends of the bus bars 63 are coupled to the stator 33 with use of the screws 64. In this state, as shown in FIG. 3, the other ends of the bus bars 63 protrude upward from the flat-portion through-hole 62a formed through the flat portion 55. In the present embodiment, the stator 33 is fixed with use of the bolt 35, although the stator 33 may be fixed by press-fitting, instead of the use of the bolt 35.

After the preparation of the respective assembly bodies, firstly, the first subassembly body and the second subassembly body are put together to complete the electric motor 31. At this time, while the front end of the rotor 34 of the electric motor 31 in the second subassembly body (rear cover 13) is inserted into the bearing 36 of the first subassembly body (casing body 12), the lead wire 66 of the resolver 48 in the second subassembly body is inserted through the flat-portion through-hole 62a so as to protrude therefrom. Since the lead wire 66 has flexibility unlike the bus bars 63 of the stator 33, the insertion of the lead wire 66 is not expected to cause any difficulty in this assembling process.

Then, the ball screw mechanism 32 is inserted into the electric motor 31 from the front of the casing body 12. Then, the third subassembly body is inserted from the front of the casing body 12, and then the cylindrical guide 23 together with the return spring 45 and the holding spring 46 is inserted into the casing body 12 to complete the electric actuator 30. After that, the ECU 50 is disposed onto the upper end surface of the flat portion 55 at the top of the motor casing 11, and is coupled thereto by a not-shown coupling means. As a result of this coupling, the upper ends of the bus bars 63, the one ends of which are coupled to the stator 33 of the electric motor 31, are located adjacent to the bus bar terminals 60 in the ECU casing 54. In this state, the bus bar terminals 60 overlap the upper ends of the bus bars 63, whereby the bus bar terminals 60 and the upper ends of the bus bars 63 are coupled with each other with use of the screws 65. As a final step, the cover 53 is attached over the casing body 52 of the ECU casing 54 and is fixed thereto by a bolt 200, so that the assembling of the electric booster 10 is completed.

When the electric booster 10 is manufactured, it is required to perform tests on the electric motor 31 and the ECU 50 separately to confirm whether the electric motor 31 and the ECU 50 each correctly function, prior to the assembling. In the present embodiment, these components are first assembled as separate bodies as mentioned above, whereby the tests can be easily performed. In addition, since the ball screw mechanism 32, the piston assembly 20 and the others can be installed into the electric motor 31 from the front of the motor casing 11, there is no need of a cumbersome process of dissolving the motor casing 11 after testing the electric motor 31, and then reassembling them.

The electric booster 10 configured as mentioned above functions as follows.

When the input rod 24, and therefore the input piston 22 moves forward in response to a depression of the brake pedal, this movement is detected by the potentiometer. The ECU 50 outputs an actuation instruction to the electric motor 31 upon receiving a signal from the potentiometer, which causes a rotation of the rotor 34 of the electric motor 31. This rotation is converted into a linear motion and then transmitted to the booster piston 21 by the ball screw mechanism 32. That is, the input piston 22 and the booster piston 21 integrally move forward (thrust), and a brake fluid pressure is generated in the pressure chambers 5A and 5B in the master cylinder 1, according to an input thrust force provided from the brake pedal to the input piston 22 and a booster thrust force provided from the electric motor 31 to the booster piston 21. When the brake is actuated in this way, if the rotation of the electric motor 31 is controlled such that a relative displacement is not generated between the input piston 22 and the booster piston 21, their neutral positions are maintained with the aid of the pair of balance springs 47 disposed between the pistons 22 and 21. Since the relative displacement amount is zero, the boost ratio at this time is determined as a fixed value based on the area ratio of the pressure-receiving areas of the booster piston 21 and the input piston 22.

On the other hand, if the booster piston 21 is relatively displaced from the above-mentioned neutral position in a direction (front side) causing the brake fluid pressure to be increased by the booster thrust force, the boost ratio (braking force) is increased, whereby a brake assist operation by the electric motor 31 is realized. At this time, the reactive force to the brake pedal (pedal reactive force) is supposed to be increased according to the increase in the brake fluid pressure. However, since the urging force of the spring at the brake pedal side (rear side) of the pair of balance springs 47 is increased according to the above-mentioned forward relative displacement of the booster piston 21, the above-mentioned increase in the pedal reactive force is compensated for by this increased urging force. On the other hand, if the booster piston 21 is relatively displaced from the neutral position in a direction (rear side) causing the brake fluid pressure to be decreased by the booster thrust force, the boost ratio (braking force) is reduced, whereby a regenerative operation in regenerative braking is realized. At this time, the pedal reactive force is supposed to be decreased according to the decrease in the brake fluid pressure. However, since the urging force of the spring at the front side of the pair of balance springs 47 is increased according to the above-mentioned backward relative displacement of the booster piston 21, the above-mentioned decrease in the pedal reactive force is compensated for by this increased urging force. That is, as a result of the adjustment of the reactive force to the brake pedal, a driver does not have discomfort or strange feeling for the braking operation.

According to the assembling process carried out in the above-mentioned manner in the present embodiment, in the first subassembly body, since the stator 33 of the electric motor 31 and the bus bars 63 are disposed at the casing body 12 having the flat-portion through-hole 62a through which the bus bars 63 are inserted, the other ends of the bus bars 63 can penetrate from the flat-portion through-hole 62a when the stator 33 and the bus bars 63 are mounted on the casing 12. Therefore, the assembling work of inserting the bus bars 63 through the flat-portion through-hole 62a of the casing body 12 can be easily accomplished.

Further, at the time of coupling the ECU 50 to the motor casing 11, the upper ends of the bus bars 63, the one ends of which are coupled to the stator 33 of the electric motor 31, are located adjacent to the bus bar terminals 60 in the ECU casing 54. Since the upper ends of the bus bars 63 are located adjacent to the bus bar terminals 60 in the ECU casing 54 in this way, it is possible to easily perform the coupling of the upper ends of the bus bars 63 to the bus bar terminals 60 with use of the screws 65. Therefore, the assemblability of the apparatus can be improved. In other words, in the above-mentioned conventional art, the through-hole through which the bus bars are inserted is formed at the first housing, while the stator of the electric motor and the bus bars are mounted at the second housing. In this case, there is a problem in that it is difficult to assemble the first housing and the second housing (especially, fittedly insert the front end of the rotor into the bearing) while inserting the predetermined-shaped bus bars through the through-hole, and thereby discouraging an easy connection therebetween. According to the present embodiment, this problem does not occur. Especially, in the above-mentioned conventional art, if the conductor connecting the stator and the ECU is made from an inflexible material and is formed into a predetermined shape, the improvement of the productivity is hindered, since the conductor connecting the stator and the ECU is subject to restrictions about where it is disposed and how it is mounted. According to the present embodiment, even when a conductor made from an inflexible material and formed into a predetermined shape (for example, bus bar) is employed, this hindrance can be prevented. Further, although a lead wire made from a rigid material and formed into a predetermined shape can be used as the conductor connecting the stator and the ECU, in this case, the lead wire should have a certain thickness in consideration of electric current supplied to the stator, as a result of which the increase in the thickness of the wire brings complexity and cumbersomeness to the handling of the wire. The use of a bus bar as in the present embodiment enables an electric current of a large value to be supplied without occupying a large space, whereby it is possible to prevent the above-mentioned problem which would occur when a lead wire is used as the above-mentioned conductor. Further, due to the use of a bus bar, the arrangement of the ECU terminal adjacent to the bus bar can be realized just by putting the ECU at a predetermined position, thereby leading to facilitation of the positioning.

Figure 1:
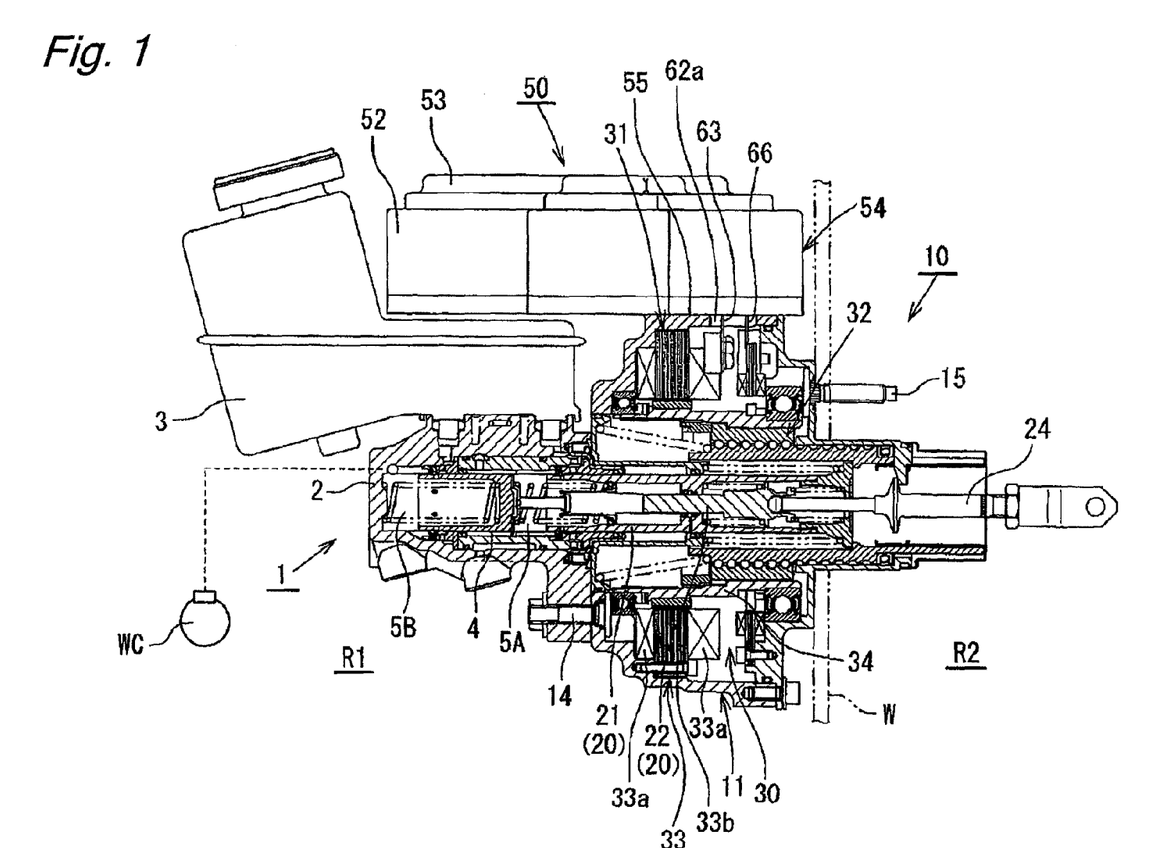
FIG. 1 is a cross-sectional view illustrating an overall structure of an electric booster as an embodiment of the present invention.
Figure 2:
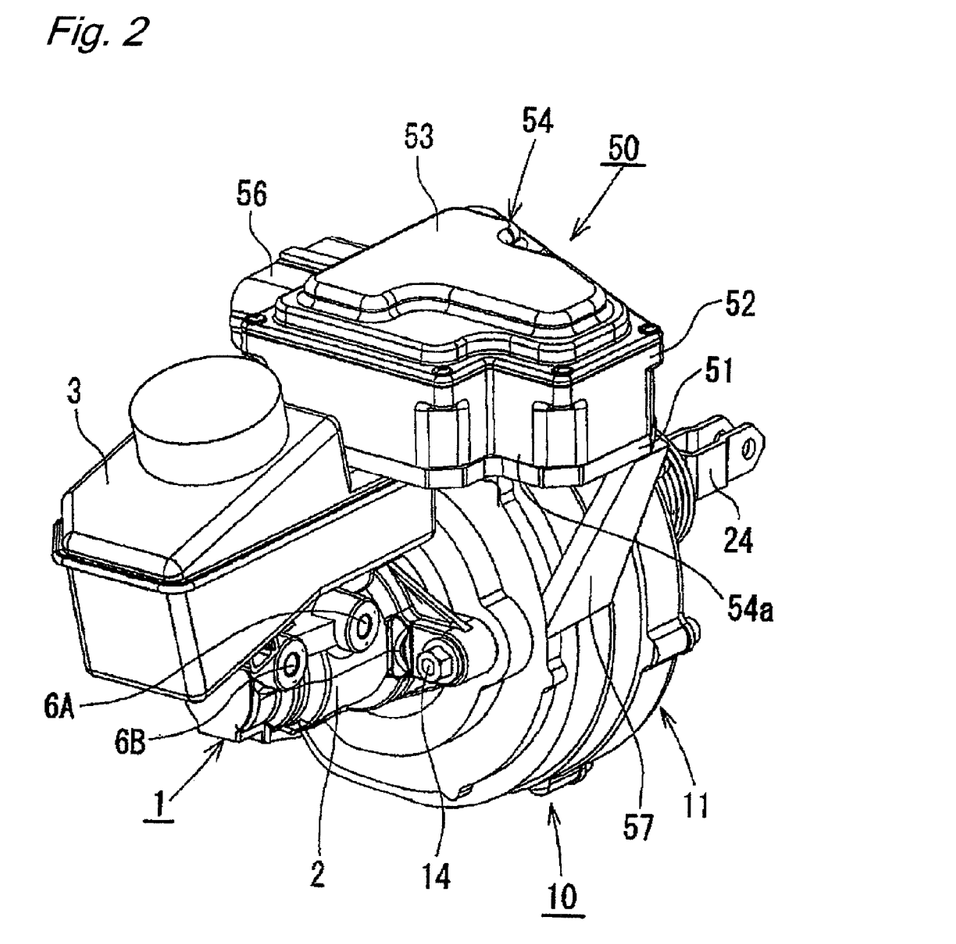
FIG. 2 is a perspective view illustrating the overall structure of the electric booster as the embodiment.

In the present embodiment, since the motor housing of the electric booster and the ECU are integrated, they can be more easily and efficiently installed onto the vehicle. However, a problem arises with such an integrated structure; that is, it would be difficult to secure a space for attaching/detaching the connecter terminal of the ECU, since contact or interference with the other devices and components in the engine room should be avoided. According to the present embodiment, the ECU casing 54 is coupled with the motor casing 11 so as to be offset in one direction relative to the motor casing 11. Therefore, as mentioned above, a space (the connecter-attaching/detaching space S) having a sufficient width for attaching/detaching the female connector 155 to/from the male connector 56 can be secured at the opposite side from the offset direction F side (refer to FIG. 5). As a result, even with the integration of the ECU 50 and the motor casing 11, it is possible to reduce contact and interference with the other devices and components in the vicinity. Further, the overall installation space including the above-mentioned connector-attaching/detaching space S is substantially symmetrical in the lateral direction of the vehicle with regard to the center line running on the axis of the master cylinder 1 (FIG. 5). Therefore, the present embodiment can be employed without modification for either of a left-hand drive car or a right-hand drive car regardless of the difference of the installation space therebetween, and therefore the utility value can be improved. Further, since the bus bar terminals 60 in the ECU casing 54 are disposed near the side surface on which the male connecter 56 is provided, it is possible to reduce the distance between the connector 56 and the ends of the bus bars 63 where the bus bars 63 are connected to the electric motor 31. Therefore, an energy loss can be reduced. Further, as shown in FIG. 1, since a part of the ECU casing 54 is disposed over, i.e., overlaps a part of the reservoir 3 of the master cylinder 1, overall miniaturization can be realized so that the electric booster can be easily and efficiently installed onto the vehicle.

Figure 6:
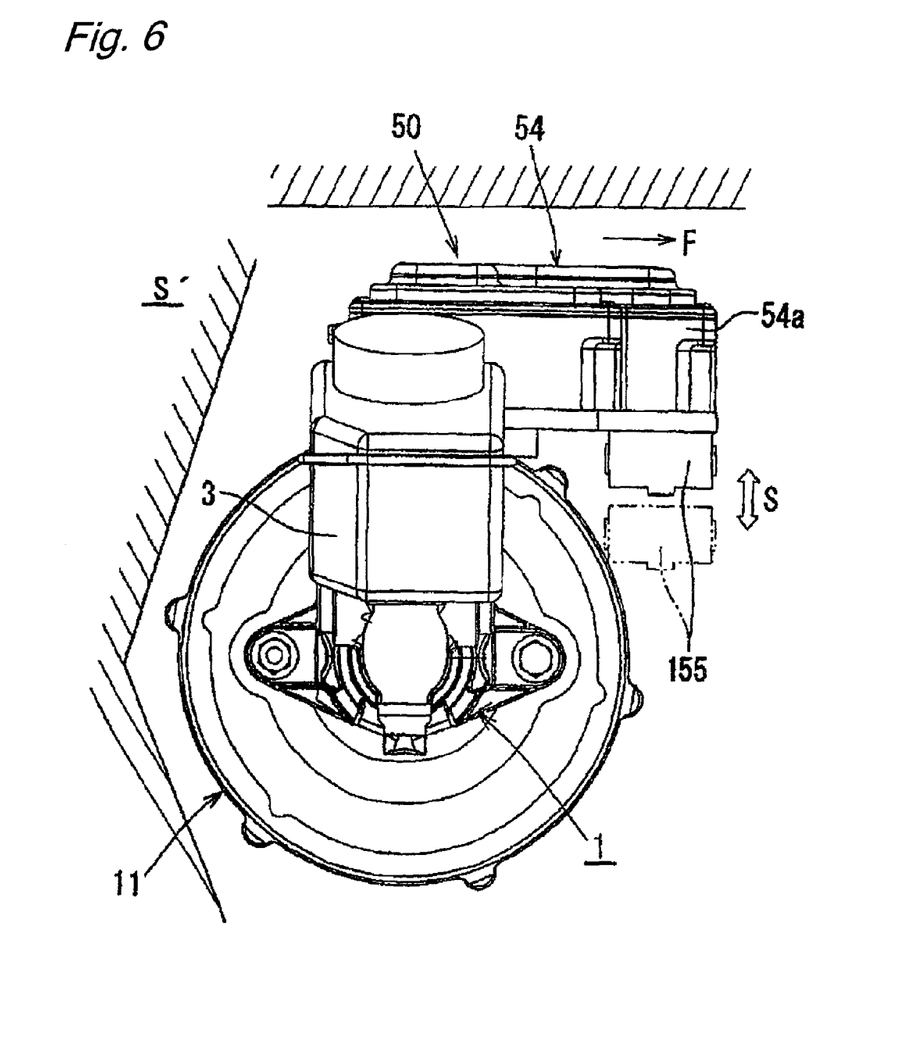
FIG. 6 is a front view illustrating a variant of the electric booster as the embodiment.

In the above-mentioned embodiment, the male connecter 56 is disposed on the side surface of the ECU casing 54 at the opposite side from the offset direction F. However, as shown in FIG. 6, the male connector 56 (the connector-attaching/detaching space S) may be disposed under the end of the ECU casing 54 at the offset direction F side (FIG. 6 only shows the other connector, i.e., the female connector 155). In this case, even if there is no enough space between the interference area S' and the opposite side of the ECU casing 54 from the offset direction F, the present embodiment can be adopted. In addition, due to disposing the male connector 56 under the end of the ECU casing 54 at the offset direction F side, it is possible to effectively prevent an entry of rain or fluid into the ECU connector, compared to, for example, a connector disposed on the top of the casing end.

In the above-mentioned embodiment, the stepped portion is constituted by the first, second and third stepped portions 12c, 12d and 12e of the front wall 12a. The present invention is not limited to this configuration, and the stepped portion may be constituted by a separate member from the front wall 12a and the casing body 12. The above-mentioned embodiment uses the bus bar 63 having a thin wide plate shape as the conductor, and therefore can prevent generation of an eddy current and an occurrence of the skin effect, whereby a heat loss can be reduced and hence the efficiency of the apparatus can be improved. A cylindrical bus bar (conductor) may be employed, instead of the plate-like bus bar 63 used in the above-mentioned embodiment. The use of a cylindrical bus bar can also prevent generation of an eddy current and an occurrence of the skin effect, whereby a heat loss can be reduced and the efficiency of the apparatus can be improved.

Further, in the above-mentioned embodiment, the male connector 56 is provided at the ECU casing 54. However, instead, the female connector 155 may be provided at the ECU casing 54.

In the above-mentioned embodiment, the booster piston (output member) 21 to be actuated by the electric motor 31 also serves as the primary piston of the tandem master cylinder 1. However, the output member 21 may be provided as a separate body from the piston in the master cylinder.

Figure 7:
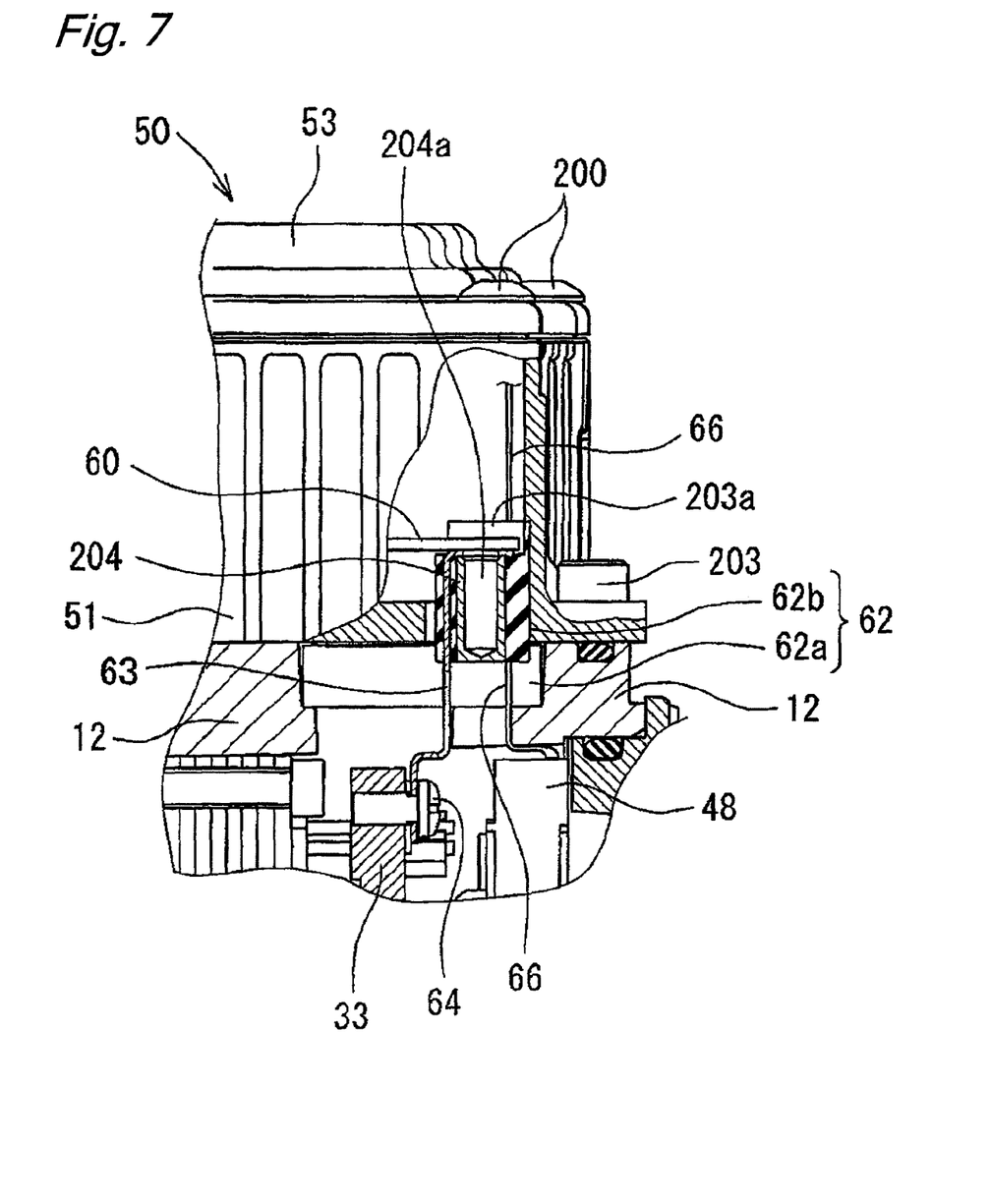
FIG. 7 illustrates a different example from the embodiment, for the coupling of upper ends of bus bars with bus bar terminals in an ECU casing.

In the above-mentioned embodiment, the three screws 65 are used for the coupling of the upper ends of the bus bars 63 to the bus bar terminals 60 in the ECU casing 54. Instead of this means, the means shown in FIG. 7 may be employed. That is, in an example shown in FIG. 7, a plastic terminal adapter 203 is provided for integrally molding the upper ends of the three bus bars 63 and three nuts 204. The bus bars 63 can be electrically connected to the bus bar terminals 60 by aligning the holes of the bus bar terminals 60 with threaded holes 204a formed in the nuts 204 of the bus bars 63, and screwing not-shown screws into the threaded holes 204a. In the example shown in FIG. 7, the upper ends of the bus bars 63 and the nuts 204 molded together through plastic are coupled to the bus bar terminals 60 in the ECU casing 54 with use of screws. Since the three bus bars 63 are retained in the single terminal adapter 203, it is possible to further improve the easiness and efficiency of the positioning process and the assembling process. Partition walls 203a are provided in the terminal adapter 203 for separating the upper ends of the adjacent bus bars 63, so that an occurrence of a short circuit can be prevented between the bus bars 63 and the bus bar terminals 60.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Applications No. 2008-021645 filed on Jan. 31, 2008 and No. 2009-181096 filed on Aug. 3, 2009. The present application also claims the benefit of U.S. patent application Ser. No. 12/361,138 filed on Jan. 28, 2009 and International Application PCT/JP2009/63884 filed on Aug. 5, 2009.

The entire disclosures of Japanese Patent Application No. 2008-021645 filed on Jan. 31, 2008, Japanese Patent Application No. 2009-181096 filed on Aug. 3, 2009, U.S. patent application Ser. No. 12/361,138 filed on Jan. 28, 2009, and International Application PCT/JP2009/63884 filed on Aug. 5, 2009 including specification, claims, drawings and summary are incorporated herein by reference in their entirety.

What is claimed is:

1. An electric booster, comprising:
an ECU;
an electric motor adapted to rotate in response to an instruction from the ECU;
a rotation-linear motion converting mechanism operable to convert a rotation of the electric motor into a linear motion;
an output member operable to transmit the converted linear motion; and
a master cylinder operable to generate a brake fluid pressure by a piston advanced by the output member;
wherein the electric motor includes a cylindrical first housing having an opening on at least one side thereof, and a second housing covering the opening;
an annular stator is contained in the first housing;
an ECU casing containing the ECU is attached to the outer surface of the first housing so as to be situated near the stator;
a through-hole is formed at an axially intermediate position of the first housing where the ECU casing is attached; and
the stator and the ECU are connected through a predetermined-shaped conductor extending through the through-hole.

2. The electric booster according to claim 1, wherein the stator is connected to the conductor at the side thereof near the opening.

3. The electric booster according to claim 1, wherein the conductor comprises a bus bar.

4. The electric booster according to claim 1, wherein a rotor of the electric motor is supported through a bearing fitted to the first housing and a bearing fitted to the second housing.

5. The electric booster according to claim 4, further comprising a rotation detector for detecting a rotation of the rotation-linear motion converting mechanism, the rotation detector being fixed to the second housing.

6. The electric booster according to claim 1, wherein the ECU casing has an opening at the side attached to the first housing, and the opening of the ECU casing is closed by the first housing.

7. An electric booster, comprising:
an ECU;
an electric motor adapted to rotate in response to an instruction from the ECU;
a rotation-linear motion converting mechanism operable to convert a rotation of the electric motor into a linear motion;
an output member operable to transmit the converted linear motion; and
a master cylinder operable to generate a brake fluid pressure by a piston advanced by the output member;
wherein the electric motor includes a cylindrical front housing having an opening on at least one side thereof;
a circumferentially extending stepped portion is formed inside the front housing at the master cylinder side thereof;
an annular stator inserted from the opposite side from the master cylinder is attached to the stepped portion;
an ECU casing containing the ECU is attached to the outer surface of the front housing so as to be situated near the stator;
the opening of the front housing is closed by a rear housing;
a through-hole is formed at an axially intermediate position of the front housing where the ECU casing is attached; and
a predetermined-shaped conductor extending through the through-hole to connect the stator and the ECU is provided.

8. The electric booster according to claim 7, wherein the stator is connected to the conductor at the side thereof near the opening.

9. The electric booster according to claim 7, wherein the conductor comprises a bus bar.

10. The electric booster according to claim 7, wherein a rotor of the electric motor is supported through a bearing fitted to the front housing and a bearing fitted to the rear housing.

11. The electric booster according to claim 10, further comprising a rotation detector for detecting a rotation of the rotation-linear motion converting mechanism, the rotation detector being fixed to the rear housing.

12. The electric booster according to claim 7, wherein the ECU casing has an opening at the side attached to the front housing, and the opening of the ECU casing is closed by the front housing.

13. An electric booster, comprising:
an electric motor adapted to rotate in response to an instruction from an ECU;
a rotation-linear motion converting mechanism operable to convert a rotation of the electric motor into a linear motion to advance a piston of a master cylinder; and
a casing housing the electric motor and the rotation-linear motion converting mechanism;
wherein the casing includes:
a cylindrical front housing having an opening on at least one side thereof; and
a rear housing covering the opening of the front housing;
an ECU casing containing the ECU is detachably attached to the casing,
the front housing includes:
a stepped portion to which an annular stator inserted from the opening is attached; and
a front housing through-hole provided at the side of the front housing which is closer to the opening than to the stepped portion;
the ECU casing includes an ECU casing through-hole which is aligned with the front housing through-hole when the ECU casing is attached to the casing,
a conductor connecting the stator and the ECU is arranged to extend through the front housing through-hole and the ECU casing through-hole.

14. The electric booster according to claim 13, wherein the conductor comprises a bus bar.

15. The electric booster according to claim 13, wherein a rotor of the electric motor is supported through a bearing fitted to the front housing and a bearing fitted to the rear housing.

16. The electric booster according to claim 15, further comprising a rotation detector for detecting a rotation of the rotation-linear motion converting mechanism, the rotation detector being fixed to the rear housing.

17. The electric booster according to claim 13, wherein the ECU casing has an opening at the side attached to the front housing, and the opening of the ECU casing is closed by the front housing.

18. The electric booster according to claim 1, wherein a circumferentially extending stepped portion is formed inside the first housing, and the stator is attached to the stepped portion.

\* \* \* \* \*